Jan. 28, 1964   R. I. MITCHELL ETAL   3,119,670
OXYGEN DETECTION METHOD AND APPARATUS
Filed Nov. 29, 1961

INVENTORS
Ralph I. Mitchell
Louis J. Hillenbrand
BY McCoy, Greene & TeGrotenhuis
ATTORNEYS

United States Patent Office 3,119,670
Patented Jan. 28, 1964

3,119,670
OXYGEN DETECTION METHOD AND APPARATUS
Ralph I. Mitchell, Galena, and Louis J. Hillenbrand, Jr., Columbus, Ohio, assignors, by mesne assignments, to The Barber Manufacturing Company, Cleveland, Ohio, a corporation of Ohio
Filed Nov. 29, 1961, Ser. No. 155,682
8 Claims. (Cl. 23—232)

This invention relates to a method of determining the amount of oxygen in a gas mixture and to an apparatus suitable for utilizing this method.

The study of the composition of combustible gas mixtures and the composition of their combustion products has always been of importance in the design and study of combustion heating equipment. A need to study combustion products is also arising in urban areas where the atmosphere is becoming increasingly polluted with combustion products. It is now well recognized that the rapid growth in the number of internal combustion engines, primarily in automobiles and trucks, has posed a serious problem of air pollution in highly populated areas.

The principle of the familiar Orsat analyzer is the basis of most manual and automatic gas analyzers. This principle involves absorption into a solution of a gas from a mixture and measurement of the resultant decrease in volume of the gas mixture. While industrial analyzers show a high degree of development of this type of equipment, these analyzers have the disadvantages of utilizing liquids, of requiring considerable set-up time and of requiring a high degree of patience and care in making any particular determination. Where a gas mixture is to be analyzed for the presence and concentration of only one gas, the use of Orsat-type analyzers is particularly frustrating. Strides have been made in preparing special apparatus for making fast immediate determinations for some gases, but there has been to date no such apparatus for oxygen analysis in a gas mixture.

One of the objects of this invention is to provide a rapid means of detecting and determining the concentration of oxygen in a gas mixture. Another object of this invention is to provide a sampling tube for the detection and determination of oxygen in a gas mixture. Another object is to provide a gas sampling tube wherein a reaction with oxygen produces a length of colored stain proportional in length to the amount of oxygen passed through the tube. Another object is to provide such a gas sampling tube wherein the colored stain is sharp and clearly visible.

Figures 1, 2, 3:
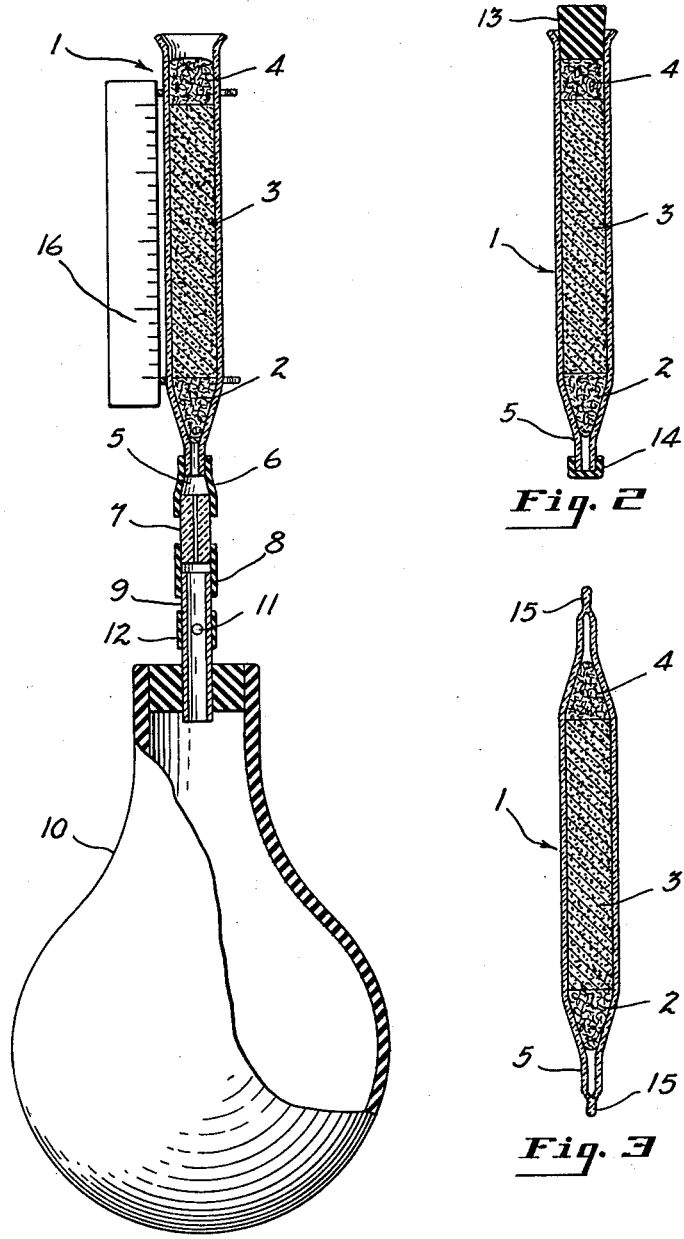
FIGURE 1 is a longitudinal section of a typical apparatus which employs the method of this invention.
FIGURE 2 is a longitudinal section of a gas sampling tube closed to the atmosphere.
FIGURE 3 is a longitudinal section of a gas sampling tube sealed as an ampule.

This invention relates to the method for detecting and determining the conventration of oxygen in a gas mixture which comprises passing a measured amount of a gas mixture lengthwise through a packed bed of inert particulate support material coated with ammoniated copper.

This invention depends for its operation upon the reaction between ammoniated copper and oxygen producing ultimately a brilliant blue complex stain. It is believed that the first contact with oxygen produces an ammoniacal-copper complex, that this copper complex subsequently reacts with oxygen producing copper oxide or hydroxide which in turn reacts in a well-known reaction with the ammonium ion to produce the blue cuprammonium ion.

The support material must be specially prepared for use in the method of this invention. Any inert material is satisfactory such as, for example, alumina, magnesia, silica and titania. It is essential that the support material be particulated uniformly in order to pack into a compact bed and still provide a porosity of the degree required for adequate gas flow through the bed. Particle size is of relatively little importance so long as the particles are approximately uniform. While any particles measurable by standard sieves are operative, particles in the range of 120–140 mesh (U.S. Sieve Series) have been found to be very satisfactory. Generally, however, the optimum particle size for any size bed can be readily determined by simple experimentation.

The inert particulate support material is uniformly wetted with a solution of copper nitrate or other soluble salt, preferably in water or in an alcohol such as ethanol. The solvent is then removed by heat evaporation or by ignition where an alcohol is the solvent, leaving a uniform coating of copper salt on the support material.

The coated support material is then heated in a tube to decompose the copper salt to copper oxide which is then reduced to elemental copper by passing hydrogen through the heated tube. These steps are ordinarily combined. The preferred temperature range is 250° C. to 350° C., and the preferred time of heating is 1 to 2 hours. It is possible to operate outside these ranges. However, excessive heating by the use of too high temperatures or too long heating periods can give undesirable reaction rates and produce undesirable reactions with the support material. At lower temperatures longer periods of time are required to reduce the copper.

In the alternative, other methods of depositing a layer of elemental copper on the support material may be employed depending, of course, on the support material. For example, copper may be deposited on the support material by vacuum metalizing or electroplating.

The support material is then cooled in a hydrogen atmosphere. The cooled support material is treated in an otherwise inert atmosphere, e.g. nitrogen, argon or helium, with concentrated ammonium hydroxide solution to cover the elemental copper coating with wet ammonia. Sufficient time is allowed for the ammonia to be absorbed on or impregnate the copper. Organic amines such as, for example, primary amines like ethyl amine and secondary amines like piperidine can be substituted for the ammonia if desired.

The resulting support material coated with ammoniated copper is then ready for use in making up confined beds or columns for test purposes. These beds or columns are most commonly prepared by packing the support material in an impervious transparent sampling tube, usually of glass, between two air-pervious plugs such as cotton batting, fiber glass gauze or asbestos wadding. Alternatively, prior to the reduction step the copper nitrate-coated support material can be packed into a tube to form the desired bed, and the support material can be subsequently treated according to the above described method while packed in a bed. However, standardization of the support material coated with ammoniated copper is much more difficult with the alternative method of preparation.

As a gas mixture containing oxygen passes through the bed, the bed turns blue starting at the entrance point of the bed and proceeding lengthwise through the bed with a very sharp interface. A check with known gas mixtures of several beds made up from a single batch of treated support material provides a calibration for any bed employing that particular treated support material. Alternatively, passing a measured volume of a known gas mixture through a partially reacted bed and measuring the increase in length of the reacted bed provides sufficient information to determine the reaction capacity of the particular bed. Thus, the length of a bed or column which turns blue for a given gas volume indicates a specific proportion of oxygen in that gas volume.

In FIGURE 1 a cylindrical glass tube 1 tapered at one end contains a conical gauze plug 2 at the tapering end. Located above the plug 2 is a packed bed or column 3 of a treated support material prepared as described above. The bed is confined at the other end by another gauze plug 4. Attached to the tube is a scale 16 on which the calibration starts at the surface of the packed bed 3 which will first be in contact with the gas to be tested, in this case the packed bed surface adjacent to plug 4. The calibration on the scale can be etched or otherwise marked directly on the tube 1 if desired.

At the tapering end of the tube 1 a cylindrical extension 5 is provided and to this extension 5 is secured by a rubber tube 6 a capillary tube 7 which is in turn secured by a rubber tube 8 to a further rigid tube 9 the other end of which is sealed in a rubber bulb 10. In the wall of tube 9 is a hole 11 which is covered by a rubber sleeve 12 acting as a one way valve.

In operation the rubber bulb 10 is squeezed and the preferably-oxygen-free gas therein is expelled through the hole 11, the rubber sleeve 12 stretching to allow escape of this gas. When the bulb 10 is released, the sleeve 12 tightens sealing the hole 11, and the atmosphere surrounding the open end of tube 1 enters the tube through the porous plug 4 into the treated support material 3 at a rate restricted to a previously determined suitably low valve by the capillary tube 7. The operation of squeezing and releasing the bulb 10 thus causes a gas to be drawn at a slow controlled rate through the bed of treated support material 3, and the existence of oxygen in the gas so drawn through the bed 3 is indicated by a change in color of the material in the bed 3. Alternatively, a roughly measured volume or gas is drawn through by simply fully collapsing bulb 10 and allowing it to fill. In this operation tube 6 can be attached directly to tube 9.

Means other than a rubber bulb 10 can be employed to cause a gas mixture to pass through the bed 3 such as a vacuum pump. Alternatively, the gas can be pushed through the bed by a pump or bellows.

Measurement of the distance from the plug 4 to the color interface in the bed of treated material 3 by means of scale 16 determines the amount of oxygen present in a given volume of gas by comparing said distance with the distances found with gaseous mixtures of known oxygen content in other sampling tubes using a packed bed of the same treated support material or by measuring the further increase in the colored length of bed after subsequently passing a known volume of oxygen through the sampling tube.

For example, if a given temperature and pressure it is known that 2 cubic centimeters of oxygen will turn the entire bed 3 blue and that 8 cubic centimeters of gas will flow through the capillary tube 7 in one minute, then if a one-minute flow of an unknown gas is required to turn the entire bed blue, it is evident that 8 cubic centimeters of the gas contained 2 cubic centimeters of oxygen, i.e., a 25% by volume oxygen concentration.

Alternatively, if the bed is uncalibrated and 4 cubic centimeters of an unknown gas, i.e., a half-minute flow through the above calibrated capillary tube, turns half the bed 3 blue; and subsequently it is found that 1 cubic centimeter of oxygen turns the rest of the bed blue, it is evident that the 4 cubic centimeters of unknown gas also must have contained 1 cubic centimeter of oxygen, i.e., a 25% by volume oxygen concentration.

As a further alternative if it is known that 8 cubic centimeters of gas will flow through the capillary tube 7 in one minute and that 2 cubic centimeters of oxygen will turn the entire bed 3 blue and if a one-minute flow of an unknown gas changes only the first 25% of the bed blue, it is evident that 8 cubic centimeters of gas contained 25% of 2 cubic centimeters of oxygen equivalent to an oxygen concentration in the unknown gas of 0.5/8 or 6.25% by volume. By this method of analysis the scale 16 can be calibrated for a given gas flow to show the oxygen concentration directly. A relatively accurate determination can be obtained if the capillary tube 7 is omitted and rubber tube 6 attaches to rigid tube 9 and if the volume of rubber bulb 10 is known. Collapsing bulb 10 and allowing it to fill will then provide a measured volume of gas through the bed 3.

The tube 1 can be sealed as shown in FIGURES 2 and 3 which are longitudinal sections of sampling tubes. The tube can be sealed with a stopper 13 or a cap 14 as in FIGURE 2 or can be heat-sealed as an ampule to give frangible tips 15 as in FIGURE 3.

The oxygen-detection method of this invention and the apparatus designed to take advantage of this method are useful in making quick, accurate oxygen determinations in stack gases, internal combustion exhaust gases and other gas mixtures without the need of cumbersome apparatus or complicated techniques. If a sampling tube is calibrated, the only measurement necessary is the volume of gas required for a measured length of the bed of detection material to change color or the length of the bed of detection material which changes color for a known volume of gas.

*Example*

A 5 percent by weight solution of copper nitrate $[Cu(NO_3)_2 \cdot 3H_2O]$ in absolute ethanol was used to wet particulate alumina in the range of 120–140 U.S. mesh. 60 milliliters of this solution uniformly coated 100 grams of the alumina. The ethanol was then removed by ignition while the alumina was stirred constantly to prevent overheating at its surface. The copper-nitrate-coated alumina was then placed in a quartz tube which was heated at 350° C. for one hour under a hydrogen stream. The resultant copper-coated alumina was allowed to cool while maintaining the hydrogen atmosphere and subsequently transferred to a chamber containing an oxygen-free atmosphere. The alumina was mixed with 0.2 milliliter of concentrated ammonium hydroxide per gram of alumina until the copper surface was impregnated with ammonia. At this time the coated alumina was free-flowing and appeared dry. The resulting coated alumina was then transferred to small glass tubing which was sealed for storage. When room air was passed through the contents of these tubes, the coated alumina turned blue at an extremely fast rate and a very sharp interface was apparent between the blue reacted alumina coating and the unreacted alumina coating. About 2 grams of coated alumina reacted completely with 7 cubic centimeters of room air.

Similar tests were made in which samples of the copper-coated alumina were impregnated with ethyl amine and piperidine respectively. The resultant material was operative for the determination of oxygen concentration in a gas mixture but was inferior to the ammoniated copper-coated alumina.

It is to be understood that in accordance with the provisions of the patent statutes, variations and modifications of the specific devices herein shown and described may be made without departing from the spirit of the invention.

What we claim is:

1. The method for detecting and determining the concentration of oxygen in a gas mixture which comprises passing a measured amount of a gas mixture lengthwise through an apparently dry packed bed of free-flowing inert particulate support material coated with copper impregnated with a nitrogen compound selected from the group consisting of ammonia, primary organic amines and secondary organic amines.

2. The method for detecting and determining the concentration of oxygen in a gas mixture, which comprises passing a measured amount of a gas mixture lengthwise through an apparently dry packed bed of free-flowing inert particulate support material coated with ammoniated copper, whereby a portion of the coated support material turns blue, the amount of said portion being directly related to the amount of oxygen present in said gas mixture.

3. An apparatus for the detection and quantitative determination of oxygen in a gas mixture comprising a transparent container having an inlet and an outlet for the gas mixture under investigation, said container having an apparently dry packed bed of inert particulate support material through which said gas mixture must pass and means for causing a measured volume of gas mixture to pass through said container and the packed bed therein, said support material being coated with copper impregnated with a nitrogen compound selected from the group consisting of ammonia, primary organic amines and secondary organic amines.

4. An apparatus for the detection and quantitative determination of oxygen in a gas mixture comprising a transparent container having an inlet and an outlet for the gas mixture under investigation, said container having an apparently dry packed bed of free flowing inert particulate support material coated with ammoniated copper through which said gas mixture must pass and means for causing a measured volume of gas mixture to pass through said container and the packed bed therein.

5. An apparatus for the detection and quantitative determination of oxygen in a gas mixture comprising a transparent container having an inlet and an outlet for the gas mixture under investigation, said container having an apparently dry packed bed of free-flowing inert particulate support material coated with ammoniated copper through which said gas mixture must pass, means for causing a measured volume of gas mixture to pass through said container, a scale calibrated to give the amount of oxygen in said gas mixture by reason of a stain reaction on the coated support material and means for supporting said scale essentially adjacent to said packed bed and oriented in the general direction defined by the inlet and outlet of said container.

6. An appartus comprising a sealed glass tube adapted to be opened at its ends for the passage of gas therethrough and an apparently dry packed bed therein of inert particulate support material coated with copper impregnated with a nitrogen compound selected from the group consisting of ammonia, primary organic amines and secondary organic amines.

7. An apparatus comprising a sealed glass tube adapted to be opened at its ends for the passage of gas therethrough and an apparently dry packed bed therein of free-flowing inert particulate support material coated with ammoniated copper.

8. An apparently dry, oxygen-detecting composition of matter consisting essentially of an inert particulate support material coated with ammoniated copper.

References Cited in the file of this patent

UNITED STATES PATENTS

| | | |
|---|---|---|
| 2,174,349 | Little-field | Sept. 26, 1939 |
| 2,460,607 | Davis | Jan. 25, 1949 |
| 2,534,229 | Carhart et al. | Dec. 19, 1950 |
| 2,569,895 | Main-Smith et al. | Oct. 2, 1951 |
| 2,823,985 | Strange | Feb. 18, 1958 |

OTHER REFERENCES

Powell et al.: "Anal. Chem.," 21, 296, 297 (1949). Copy in Div. 59.